US007971227B1

(12) United States Patent  (10) Patent No.: US 7,971,227 B1
Marko et al.  (45) Date of Patent: Jun. 28, 2011

(54) METHOD AND APPARATUS FOR IMPLEMENTING FILE TRANSFERS TO RECEIVERS IN A DIGITAL BROADCAST SYSTEM

(75) Inventors: Paul D. Marko, Pembroke Pines, FL (US); Craig P. Wadin, Sunrise, FL (US)

(73) Assignee: XM Satellite Radio Inc., Washington, DC (US)

( * ) Notice: Subject to any disclaimer, the term of this patent is extended or adjusted under 35 U.S.C. 154(b) by 3140 days.

(21) Appl. No.: 09/695,228

(22) Filed: Oct. 25, 2000

(51) Int. Cl.
*H04N 7/16* (2011.01)
(52) U.S. Cl. .......... 725/151; 725/75; 725/131; 725/139; 370/394; 370/473; 370/474
(58) Field of Classification Search ............ 725/75, 725/85, 134, 139–142, 34, 131, 151–152; 375/240.25–16; 348/441; 370/389, 473–474, 370/394
See application file for complete search history.

(56) References Cited

U.S. PATENT DOCUMENTS

| 5,339,239 | A |   | 8/1994  | Manabe et al. ............ 364/401 |
| 5,406,626 | A |   | 4/1995  | Ryan ........................ 380/50 |
| 5,414,455 | A | * | 5/1995  | Hooper et al. ............. 725/88 |
| 5,524,051 | A |   | 6/1996  | Ryan ........................ 380/9 |
| 5,539,635 | A | * | 7/1996  | Larson, Jr. ................ 700/234 |
| 5,572,442 | A |   | 11/1996 | Schulhof et al. .......... 364/514 C |
| 5,590,195 | A |   | 12/1996 | Ryan ........................ 380/9 |
| 5,732,324 | A | * | 3/1998  | Rieger, III ................. 455/3.01 |
| 5,751,806 | A |   | 5/1998  | Ryan ........................ 380/9 |
| 5,801,781 | A | * | 9/1998  | Hiroshima et al. ........ 348/441 |
| 5,809,144 | A | * | 9/1998  | Sirbu et al. ............... 705/53 |
| 5,809,472 | A |   | 9/1998  | Morrison .................. 704/500 |
| 5,815,671 | A | * | 9/1998  | Morrison .................. 709/247 |
| 5,819,049 | A |   | 10/1998 | Rietmann ................. 395/200.69 |
| 5,889,860 | A |   | 3/1999  | Eller et al. ................ 380/4 |
| 5,914,941 | A | * | 6/1999  | Janky ...................... 370/313 |
| 6,112,226 | A | * | 8/2000  | Weaver et al. ............ 709/203 |
| 6,222,841 | B1 | * | 4/2001 | Taniguchi ................. 370/389 |
| 6,430,183 | B1 | * | 8/2002 | Satran et al. ............. 370/389 |
| 6,609,097 | B2 |   | 8/2003 | Costello et al. |
| 6,694,200 | B1 | * | 2/2004 | Naim ....................... 700/94 |
| 6,778,808 | B1 | * | 8/2004 | Shimazu ................... 455/3.03 |
| 6,801,536 | B1 | * | 10/2004 | Foster et al. ............. 370/412 |
| 2002/0184038 | A1 |   | 12/2002 | Costello et al. |
| 2003/0212996 | A1 | * | 11/2003 | Wolzien .................. 725/60 |

\* cited by examiner

*Primary Examiner* — Farzana Hossain
(74) *Attorney, Agent, or Firm* — Roylance, Abrams, Berdo & Goodman, LLP

(57) ABSTRACT

A method and apparatus are provided for implementing transfer of files to receivers in a digital broadcast system. The data files are partitioned into segments that are interspersed in a broadcast signal. Segment headers are provided to indicate the number of segments that constitute a corresponding data file and to uniquely identify each of segment in a data file. Receivers allocate memory to store segments for a selected data file based on data in the segment headers. The headers can be provided with data to address data files to selected receivers. Receivers are programmed to monitor the progress of storing segments of a selected data file during an initial broadcast and to use rebroadcasts to complete a file transfer.

17 Claims, 9 Drawing Sheets

ORIGINAL FILE #45

SEGMENTED FILE

SEGMENTED FILE WITH SEGMENT HEADERS

SEGMENT HEADER DATA

METHOD AND APPARATUS FOR IMPLEMENTING FILE TRANSFERS TO RECEIVERS IN A DIGITAL BROADCAST SYSTEM

CROSS REFERENCE TO RELATED APPLICATIONS

Related subject matter is disclosed and claimed in co-pending U.S. patent application of Paul D. Marko et al filed even date herewith for "Method and Apparatus for Employing Stored Content at Receivers to Improve Efficiency of Broadcast System Bandwidth Use" Ser. No. 09/695,226 in co-pending U.S. patent application of Paul D. Marko et al filed even date herewith for "Method and Apparatus for Controlling User Access and Decryption of Locally Stored Content at Receivers in a Digital Broadcast System" Ser. No. 09/695,081 in co-pending U.S. patent application of Paul D. Marko et al filed even date herewith for "Method and Apparatus for Prompting a Reverse Channel Response From a Receiver in a Digital Broadcast System" Ser. No. 09/695,315 in co-pending U.S. patent application of Paul D. Marko et al filed even date herewith for "Method and Apparatus for Providing On-Demand Access of Stored Content at a Receiver in a Digital Broadcast System" Ser. No. 09/695,139 in co-pending U.S. patent application Ser. No. 09/388,926, filed by Hien D. Ma et al on Nov. 4, 1999; and in co-pending U.S. patent application Ser. No. 09/433,862, filed by Paul D. Marko et al on Nov. 4, 1999; all of said applications being expressly incorporated herein by reference.

FIELD OF THE INVENTION

The invention relates generally to an apparatus and method for implementing file transfers in a one-way communication system such as to receivers in a digital broadcast system.

BACKGROUND OF THE INVENTION

Satellite digital audio radio service (SDARS), a satellite broadcast service established by the U.S. Federal Communications Commission (FCC), has been proposed using satellite transmission of digital audio programs to radio receivers. The radio receivers can be stationary receivers (i.e., with a receiver antenna pointed for optimal line of sight (LOS) reception from a satellite) or mobile receivers (e.g., a receiver that is hand-carried by a user or is mounted in a vehicle).

A programming center 20 for SDARS can provide different types of programs such as music programs (e.g., jazz, classical, rock, religious, country, and so on) and news programs (e.g., regional, national, political, financial and sports) for transmission via satellite(s). The SDARS can also provide emergency information, travel advisory information, educational programs, and the like. These programs are generally time division multiplexed into a composite data stream with other information such as overhead information (e.g., data for framing, synchronization and service layer headers).

It would be advantageous to provide receivers in digital broadcast systems in general, and particularly mobile satellite receivers in vehicles, with information such as software updates for engine operation, user information such as updated maps and local weather and traffic reports, and the like. This information, however, is likely to consist of relatively large files which would require large amounts of bandwidth of the digital broadcast system to transmit in a short period of time. As the primary application for the SDARS service is the transmission of broadcast programs, it is not preferred to take large amounts of bandwidth away from the broadcast programs to support file transfer applications. Accordingly, a need exists for transfer of data to receivers in a digital broadcast system which minimizes the impact on system bandwidth requirements for transmitting other broadcast programs.

File transfers between devices in two-way communication systems (e.g., packetized transmission between network computers using a protocol such as TCP/IP) are facilitated by the ability of the devices to acknowledge successful transmission of packets and to request retransmission of those packets that were not successfully received. Digital broadcast signals, however, generally do not have a back channel with which a receiver can inform the broadcast station that part of a file was not successfully received. In co-pending U.S. patent application Ser. No. 09/695,315, a satellite receiver in a vehicle operates in conjunction with a cellular telephone to provide a back channel for such revenue-generating communications as transmitting GPS coordinates to a vehicle fleet operations control center. File transfer messaging (e.g., transmission acknowledgments and retransmission requests) is not a cost-effective use for such a back channel.

In addition, mobile satellite receivers can be subject to service outages from loss of line of sight reception due to physical obstructions, as well as from interference. Mobile satellite receivers are also turned off for periods of time when the vehicle is not in use. Accordingly, a need exists for a file transfer mechanism in a digital broadcast system which does not require a back channel between the receiver and the broadcast station and which provides means for overcoming data loss due to obstructions, interference or other interruptions during file transfer such as interruptions in vehicle use.

SUMMARY OF THE INVENTION

In accordance with the present invention, a method and apparatus for implementing the transfer of files to receivers in a digital broadcast system which does not require a significant amount of the instantaneous bandwidth of said digital broadcast system.

In accordance with an aspect of the present invention, the data files are partitioned into segments that are interspersed in a broadcast signal. Segment headers are provided for respective segments to indicate the number of said segments that constitute a corresponding data file and to uniquely identify each of segment in a data file.

In accordance with another aspect of the present invention, the data files are retransmitted over a time interval and with a periodicity according to a maximum predetermined time delivery interval of the data file and the bandwidth available for transmission.

In accordance with another aspect of the present invention, the segment headers are used by a receiver to allocate memory with which to store segments for a selected data file. The receiver is operable to use the segment headers to determine which segments of a data file have been received and stored.

In accordance with another aspect of the present invention, the receiver is operable to generate an output signal to indicate to a user that a data file as has been received in its entirety and is available for playback.

In accordance with still another aspect of the present invention, the receiver is operable in a wake-up mode to determine from a rebroadcast schedule when to tune to a broadcast signal and commence reception of segments identified by the receiver as having not yet been received. The receiver can enter wake-up mode when the content of the allocated memory space for that data file is determined to be a selected and relatively small percentage from being complete.

In accordance with an aspect of the present invention, messages comprising data files are provided with message identification codes to indicate when the messages are intended for selected ones of the receivers. The receivers are operable to discard segments whose headers have message identification codes that do not correspond to the receiver.

BRIEF DESCRIPTION OF DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 1:
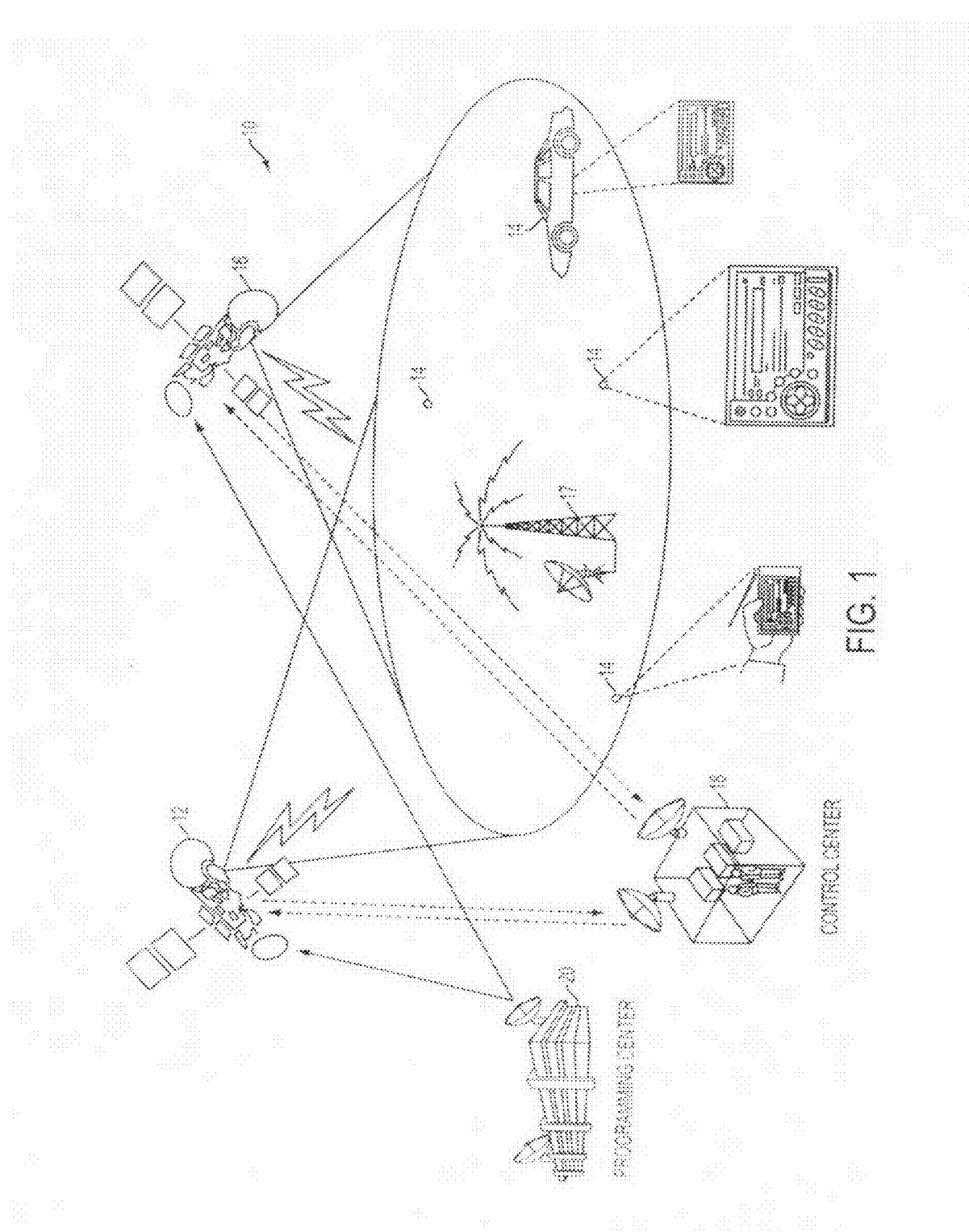
FIG. 1 illustrates an SDARS system constructed in accordance with an embodiment of the present invention.

FIG. 1 depicts a satellite broadcast system 10 which comprises at least one geostationary satellite 12, for example, for line of sight (LOS) satellite signal reception at receiver units indicated generally at 14. The satellite broadcast system 10 can be used for SDARS, for example. Another geostationary satellite 16 at a different orbital position is preferably provided for diversity purposes. One or more terrestrial repeaters 17 can be provided to repeat satellite signals from one of the satellites in geographic areas where LOS reception is obscured by tall buildings, hills and other obstructions. It is to be understood that different numbers of satellites can be used, and satellites in other types of orbits (e.g., elliptical orbits) can be used. Alternatively, a broadcast signals can be sent using only a terrestrial transmission system and no satellites.

As illustrated in FIG. 1, a receiver unit 14 can be configured for stationary use (e.g., on a subscriber's premises), or mobile use (e.g., portable use or mobile use in a vehicle), or both. A control center 18 is provided for telemetry, tracking and control of the satellites 12 and 16. A programming center 20 is provided to generate and transmit a composite data stream via the satellites 12 and 16 which comprises a plurality of broadcast channels.

Figure 2:
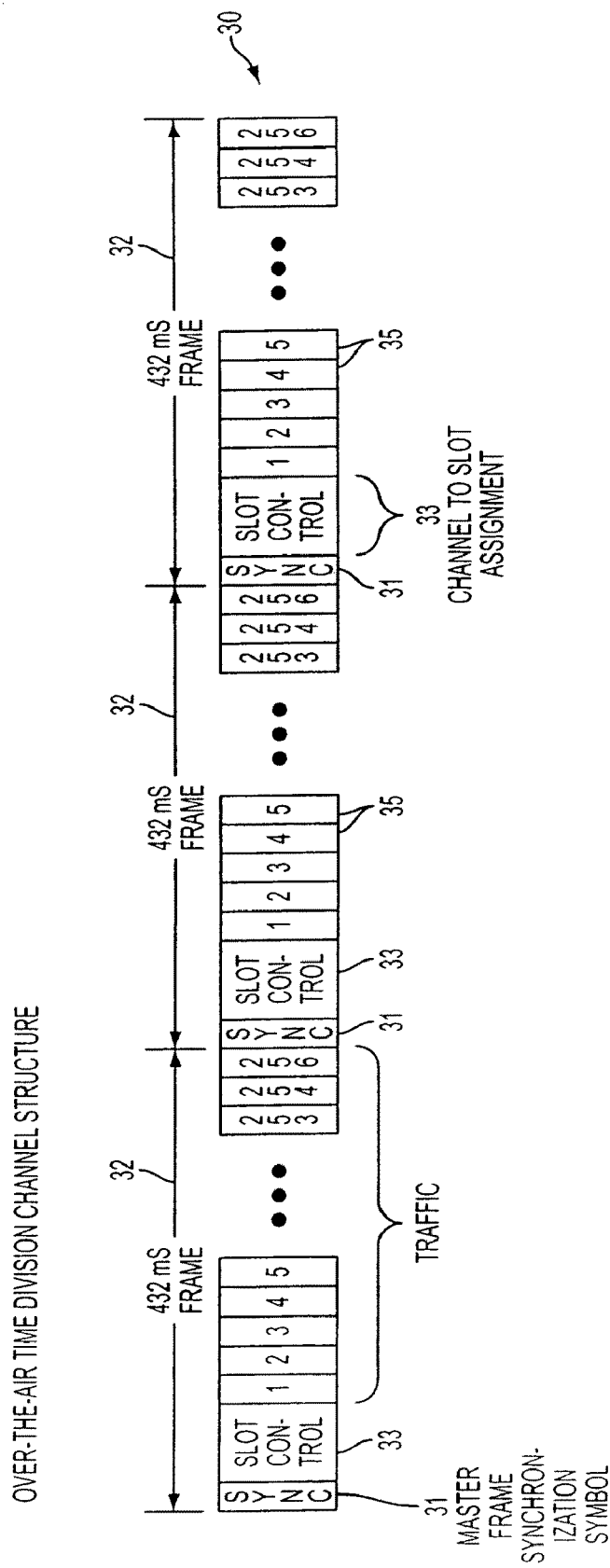
FIG. 2 illustrates a time division multiplexed data stream for broadcast transmission in accordance with an embodiment of the present invention.

An exemplary composite data stream 30 is illustrated in FIG. 2. The system 10 can broadcast a composite data stream 30 generated, for example, by time division multiplexing a plurality of broadcast channels, along with other data such as overhead data. In the illustrated example, the composite data stream 30 comprises frames 32. Each of the frames 32 is provided with a master frame synchronization symbol 31, a slot control field 33 and a plurality of time slots 35 for transporting traffic channels (e.g., 256 time slots per frame). The slot control field 33 comprises overhead data such as channel-to-slot assignment data. The receivers are therefore configured to demultiplex a received composite data stream using the synchronization symbols and the slot control field data to playback a selected one of the broadcast channels.

The programming center 20 is configured to obtain content from different sources and providers which can comprise both analog and digital information such as audio, video, data, program label information, auxiliary information, and so on. For example, the programming center 20 can provide SDARS having on the order of 100 different program channels to transmit different types of music programs (e.g., jazz, classical, rock, religious, country, and so on) and news programs (e.g., regional, national, political, financial and sports). The SDARS can also provide emergency information, travel advisory information, educational programs, and the like.

The types of content to be provided in a broadcast channel is determined manually or automatically via a computer, based on contractual and financial arrangements with information providers, and demographic and financial decisions determining the types of programming to be provided via the programming center 20. In addition, a broadcast channel 30 can comprise plural service components to provide a plurality of different services. For example, a number of service components in a broadcast channel can be related to the same service and can include an audio component and a video and/or a digital data stream comprising auxiliary information, or another audio component to insert advertising information relating to the audio or video program.

In accordance with an aspect of the present invention, the programming center 20 is also configured to perform file transfers to one or more receivers 14. It can be useful to transmit data to the receivers 14 that is not necessarily one of the broadcast programs such as a music program or news program. For example, a car manufacturer may wish to send a software update to all vehicles of a particular model and manufacturing date, in which case, the user would not be playing back the transferred file. It may be desirable to send a mobile receiver updated maps or local weather or traffic reports, which the user can review on-demand as described in the above-referenced patent application Ser. No. 09/695,315. As discussed above, these types of files are generally large files that would require a significant amount of the instantaneous broadcast system bandwidth if broadcast as one program. Further, the vehicle(s), from which the receivers 14 intended to receive the file are operated, may not be in use during the entire transmission of such a file.

Figure 3:
FIG. 3 illustrates a file to be transmitted in accordance with the present invention.
Figure 4:
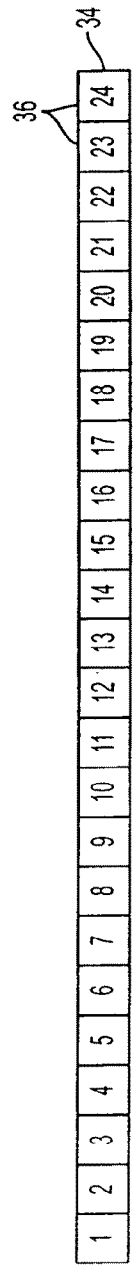
FIG. 4 depicts a segmented file constructed in accordance with an embodiment of the present invention.
Figure 5:
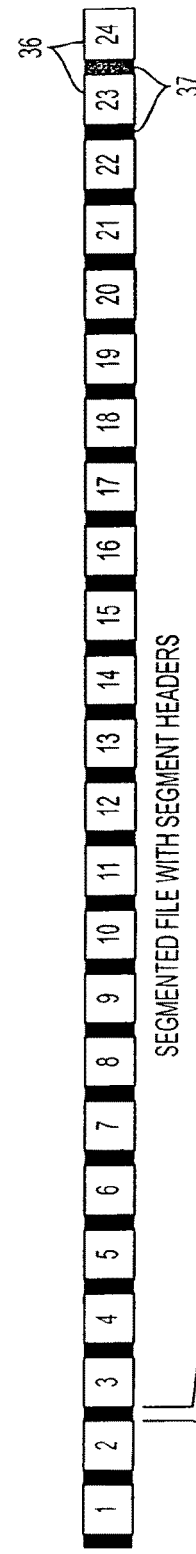
FIG. 5 depicts a segmented file and segment header data constructed in accordance with an embodiment of the present invention.
Figure 5:
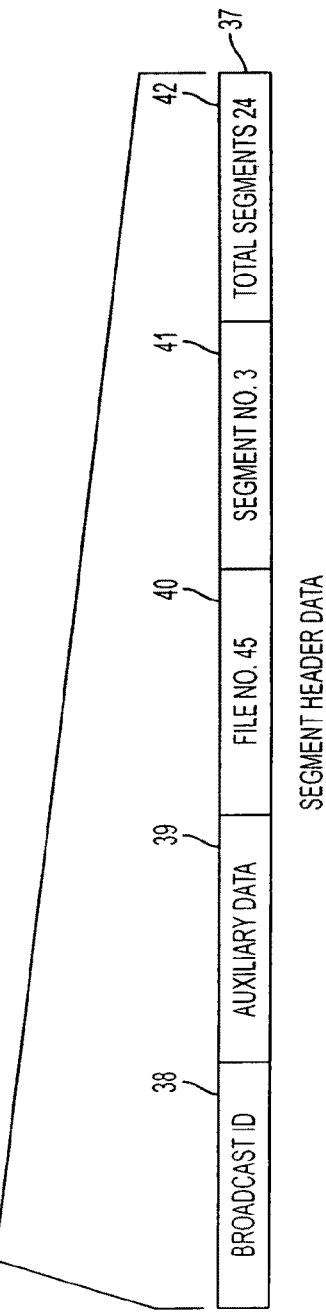

In accordance with the present invention, a file 34 to be transferred via the digital broadcast system such as the system 10 is partitioned at the program center 20, broadcast station 18 or other device in the transmit segment of the system for transmission as segments 36, as shown in FIGS. 3 and 4. The partitioning of the file 34 allows for smaller portions of the file (e.g., 8 kbps channels) to be interspersed with other broadcast content, thereby reducing the demand on the instantaneous bandwidth of the system. As shown in FIG. 5, the segments 36 are provided with headers 37 to facilitate their capture in a local storage device at the receiver 14. The baseband data stream illustrated in FIG. 5 can then be modulated and multiplexed as needed for transmission via the composite data stream illustrated in FIG. 2, for example.

With continued reference to FIG. 5, the segments 36 in a segmented file 34 (e.g., file 45 in FIG. 3) are each provided with a segment header 37 comprising a broadcast identifier (ID) field 38, an auxiliary data field 39, a file number field 40, a segment number field 41 and a total segments field 42. Each file 34 to be transmitted by the digital broadcast system is preferably uniquely numbered, and this number is provided in the file number field of each segment header. The segments 36 associated with a particular file 34 are preferably consecutively numbered. Thus, the total segments field 42 in a segment header 37 indicates the number of segments 36 in the message generated to transmit the file, and the segment number field 41 indicates to a receiver 14 which of the segments in the message is being received. The auxiliary data field 39 can include data such as the destination for the transferred file, that is, which of a number of telematic-enabled devices in the vehicle will be using the file. For example, the file can be used by a GPS receiver in the vehicle or can be intended for the patch RAM in the vehicle engine. The auxiliary data field 39 can also include an expiration date for the transferred file. The broadcast ID 38 indicates which receivers are to receive and capture the file. As discussed below, messages can be sent to individual receivers, to groups of selected receivers, or to all receivers 14.

Figure 6:
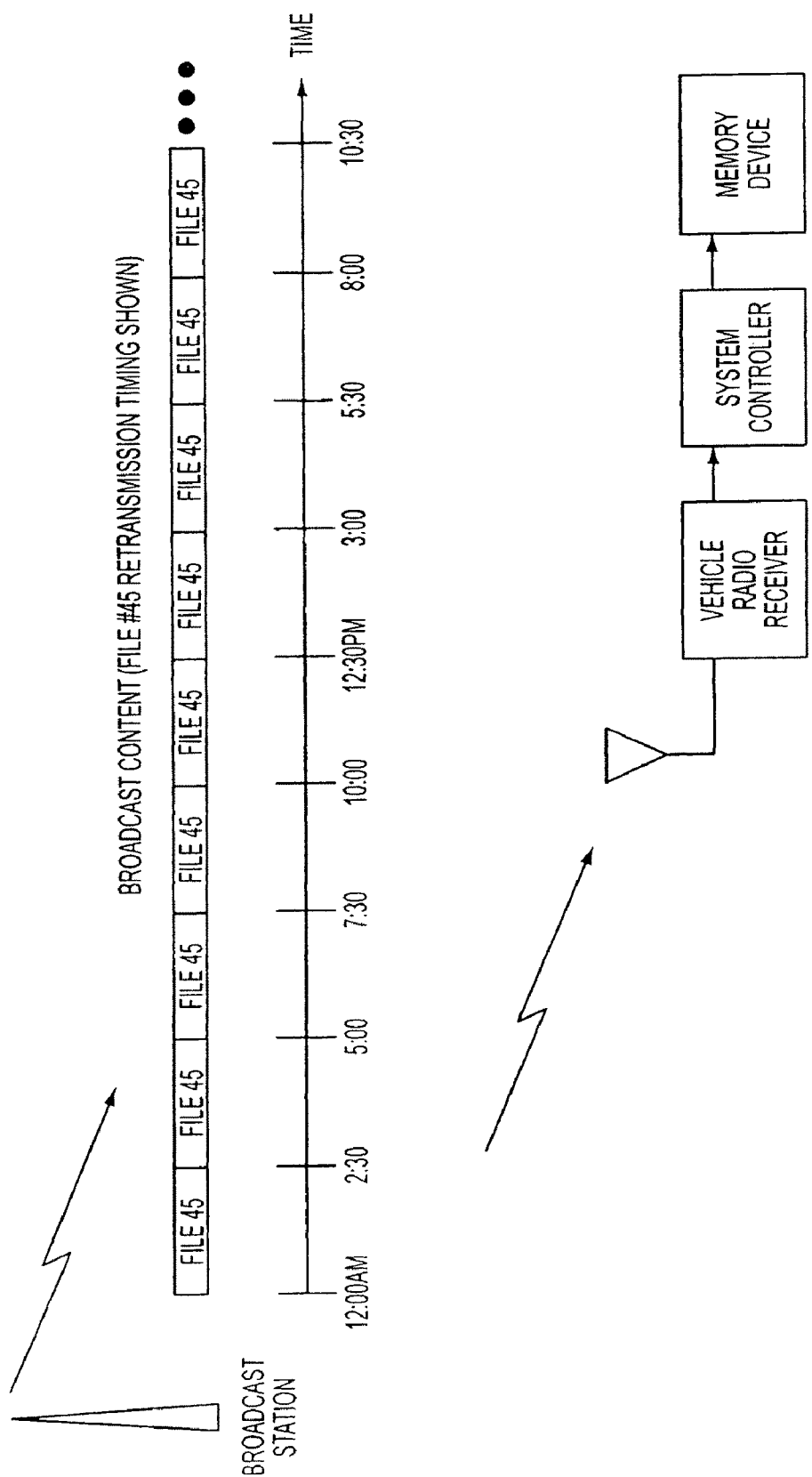
FIG. 6 illustrates retransmission of a segmented file in accordance with an embodiment of the present invention.

The broadcast station 18 is programmed to broadcast files 34 for file transfer to receivers 14 on a repeated-basis for a selected number of times. For example, the broadcast station 18 can transmit a file 34 on a periodic basis. In the illustrated example, the file "45" is partitioned and the resulting segments are interspersed in the composite data stream so as to require 2.5 hours to transmit all of the segments in the file. It is to be understood that the segments can be transmitted in any predefined order either continuously as shown, or in a time divided manner in which time gaps are present between or within segments. As shown in FIG. 6, the file is retransmitted every 2.5 hours and therefore essentially continuously for the duration it is desired to transfer the file to the receiver. The duration and retransmission intervals are predetermined based on the file validity period and available bandwidth. For example, a file containing an image of a weather map may be valid for a period of 1 hour, whereas a GPS map may be valid for a period of 1 year. If the weather map file size is 100 kilobits and the available transmission bandwidth is 1 kilobits per second, the weather map can be retransmitted up to once every 100 seconds. It is to be understood that a file can be retransmitted intermittently and on various duty cycles such as only once or twice a day, on a weekly or multi-weekly basis, and so on. The duty cycle depends on the type of content in the file, how often the content needs to be updated, the manner in which the content is used (i.e., content that is viewed on-demand frequently or infrequently by users, or content that is employed in a background application by a telematic-enabled device such as GPS map updating by a GPS receiver) and the available bandwidth, among other factors.

Figure 7:
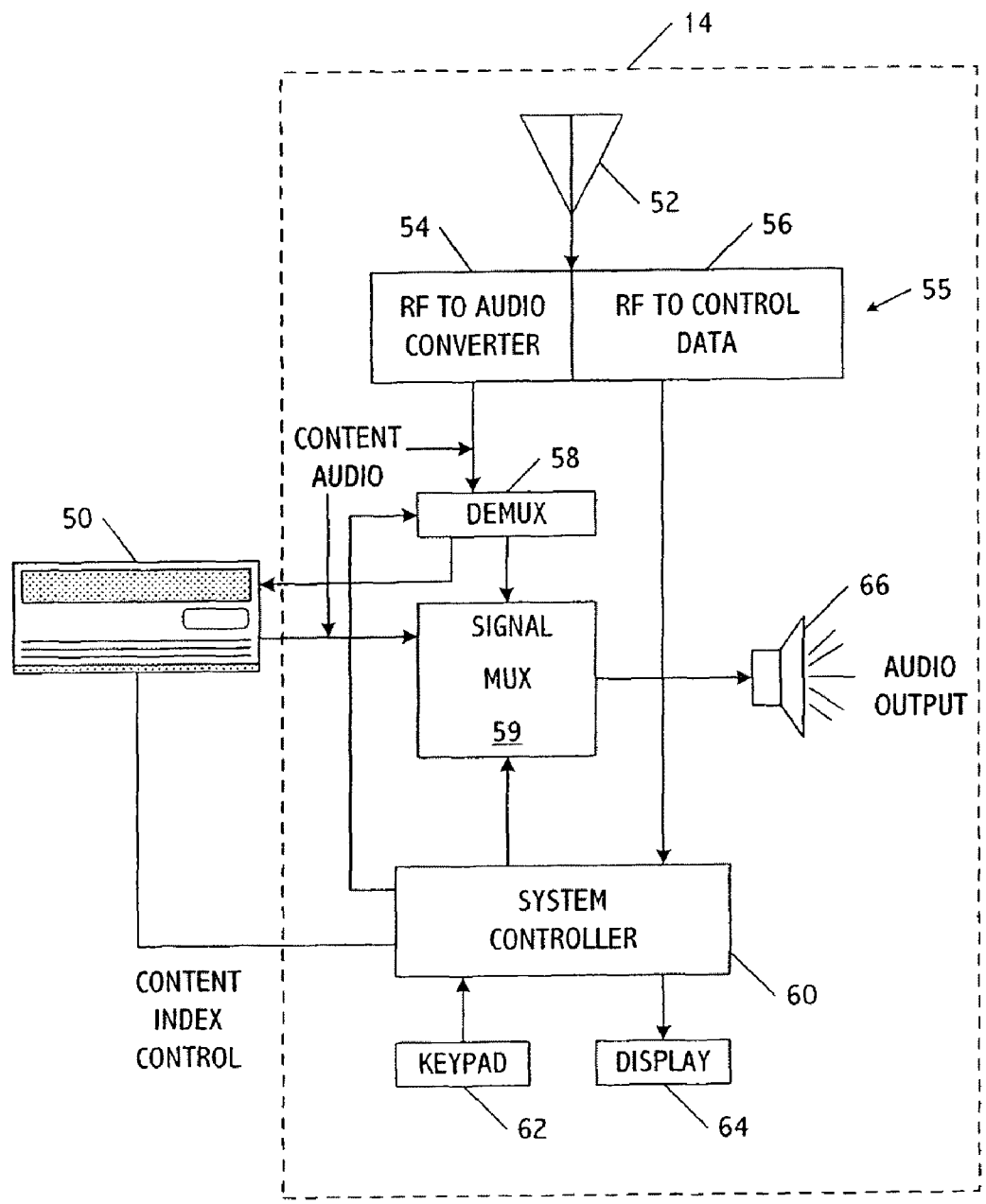
FIG. 7 illustrates an exemplary receiver with a local storage device constructed in accordance with an embodiment of the present invention.

Capture and storage of segments at receivers 14 will now be described. FIG. 7 illustrates an exemplary receiver 14 with a local storage device 50 for storing received segments of files that were partitioned and broadcast. The local storage device 50 can be any memory device that can store information in a digital format and can include, but is not limited to, a floppy disc, a hard disk, a compact disc (CD), a digital video disc (DVD), an optical disc, random access memory (RAM), a FLASH memory, a disk pack, digital audio tape (DAT), or other medium for storage and retrieval of digital information. The local storage device 50 can be provided within a receiver 14 chassis or connected externally thereto.

With continued reference to FIG. 7, the receiver 14 comprises an antenna 52 for receiving a broadcast signal from at least one of the satellites 12 and 16 and/or a terrestrial repeater 17. As stated previously, the broadcast signal can originate from only a terrestrial transmission system. A converter 55 is preferably provided which is operable to perform radio frequency (RF) downconversion, and any demodulation, synchronization, demultiplexing, de-interleaving and decoding functions performed as part of the transport layer at a broadcast station in the system 10, and described in the aforementioned application Ser. No. 09/433,862, to obtain the baseband broadcast channels from the broadcast composite data stream. The receiver 14 comprises a controller 60 connected to a display 64 and keypad 62 to allow a user to select a broadcast channel, among other operations. In response to the user program channel selection, the controller 60 provides control signals to a demultiplexer 58 to select the corresponding broadcast channel for output via a loudspeaker 66 or other output device (e.g., a display or monitor).

As shown in FIG. 7, the converter 55 comprises an RF-to-audio converter 54 and an RF-to-control data converter 56 to extract, respectively, the traffic (e.g. the segments 36) and control data (e.g., headers 37) from the received signal. The traffic such as a selected audio program is preferably provided to the output device 66 via a signal multiplexer 59 as soon as the content thereof is received and processed via the converter 55 and demultiplexer 58. Traffic such as the segments 36 intended for that receiver is provided to the local storage device.

In accordance with the present invention, the converter 55 removes the segment headers 37 from the received data stream and determines from the broadcast ID 38 whether the segment is intended for that receiver 14. The system controller 60 or the converter 55 stores selected broadcast IDs 38. Broadcast IDs 38 indicate whether a message is intended for a selected receiver or for one or more groups in which the receiver is included (e.g., model/year of car owned by user or in which receiver is used, users of selected products and/or services, and the like). For example, a group broadcast ID can be assigned to a fleet of vehicles such as cars belonging to a car rental agency or a car manufacturer. A car manufacturer can use the file transfer operation of the present invention to send car owners maintenance reminders and advertisements for specials on car services.

The size of the segments 36 and therefore the amount of memory to be allocated to each segment are preferably predefined system parameters. Accordingly, when a receiver 14 processes a segment header 37, the receiver determines how much of the local storage device 50 is needed for the file based on the data in the total segments field 42. In addition, the local storage device 50 can have sections thereof that are reserved for certain types of file transfer data such as on-demand content (e.g., maps, local weather or traffic advisory reports, stocks, and the like). It is understood that, in most applications, the receiver system can contain a first memory block dedicated to building new files such as a weather map images, fixed length text or digital voice files, and a second memory block for storing the files once all segments have been received.

Figure 8:
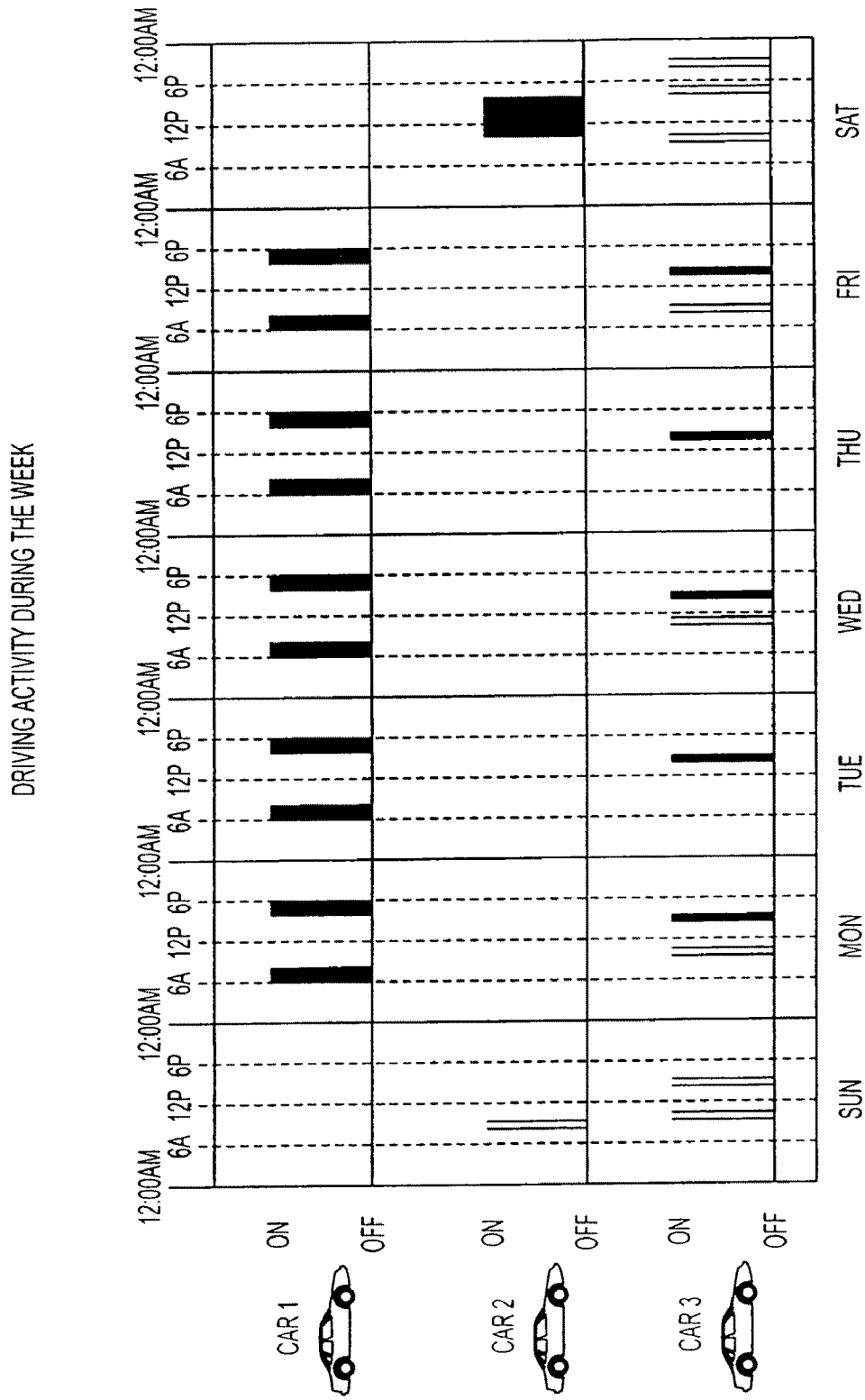
FIG. 8 illustrates exemplary use patterns for vehicles with mobile receivers.

FIG. 8 depicts exemplary vehicle use patterns. The receiver 14 preferably receives power from the vehicle battery and is equipped with a back-up battery source. Accordingly, the frequency with which a vehicle is used affects how the receiver captures files. Car 1 in FIG. 8 illustrates a user who uses a vehicle primarily for commuting to work on weekdays at essentially predictable commuting times each day (e.g., 6:00-7:30 am and 4:30-6:00 pm). Car 2 illustrates a user who uses a vehicle less frequently than Car 1, but one of the trips is relatively long, that is, a short trip from 8:45-9:00 am on Sunday to go to church and a longer trip on Saturday from 9:00 am until 4:00 pm. Finally, the user of Car 3 drives the vehicle more frequently than the users of Cars 1 and 2 and the average trip is of less duration (e.g., for errands). Accordingly, a file intended to be transferred to users who are prone to driving activity similar to the chart for Car 3 may need to be re-transmitted more frequently.

Figure 9:
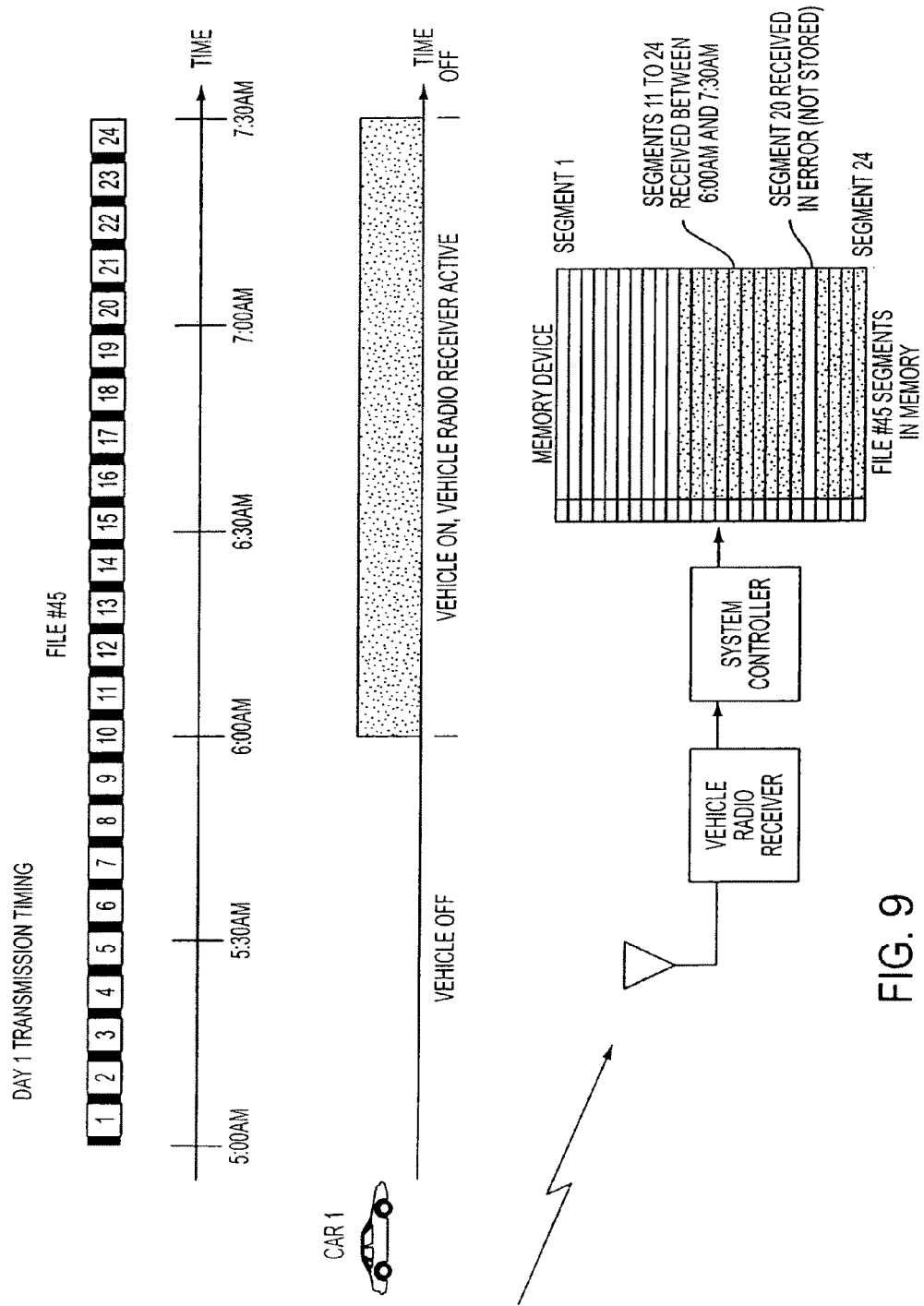
FIGS. 9, 10 and 11 illustrate, respectively, file transfer and capture of segments in accordance with an embodiment of the present invention.

The capture of a transmitted, partitioned file 34 will be described with reference to Car 1 for illustrative purposes. With reference to FIG. 9, file "45" is transmitted at periodic intervals with one interval commencing at 5:00 am. Thus, a receiver 14 in Car 1 is able to receive segments 11 through 24. The system controller 60 in the receiver determines from the segment headers 37 how much memory to allocate and which segments 36 were received. By way of an example, one of the segments was unsuccessfully captured (e.g., due to service outage).

Figure 10:
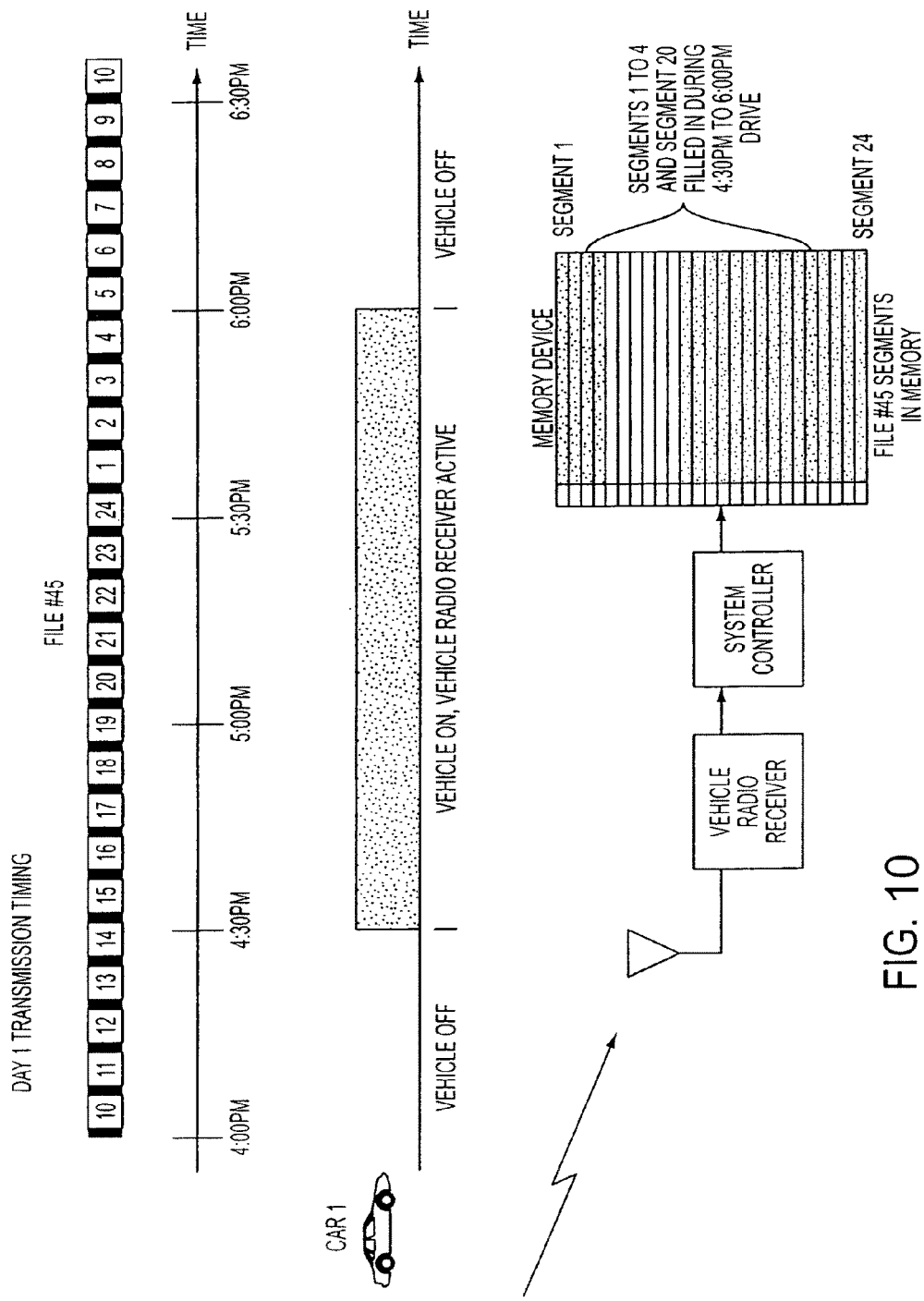

With reference to FIG. 10, the receiver 14 in Car 1 receives and stores additional segments of file 45 (i.e., segments 1-4) during the evening commute home from work, as well as the segment that was unsuccessfully received during the earlier commute (e.g., segment 20). The segments 15-19 and 21-24 received during the morning commute are discarded by the receiver since they have already been successfully received and stored in the local storage device 50.

Figure 11:
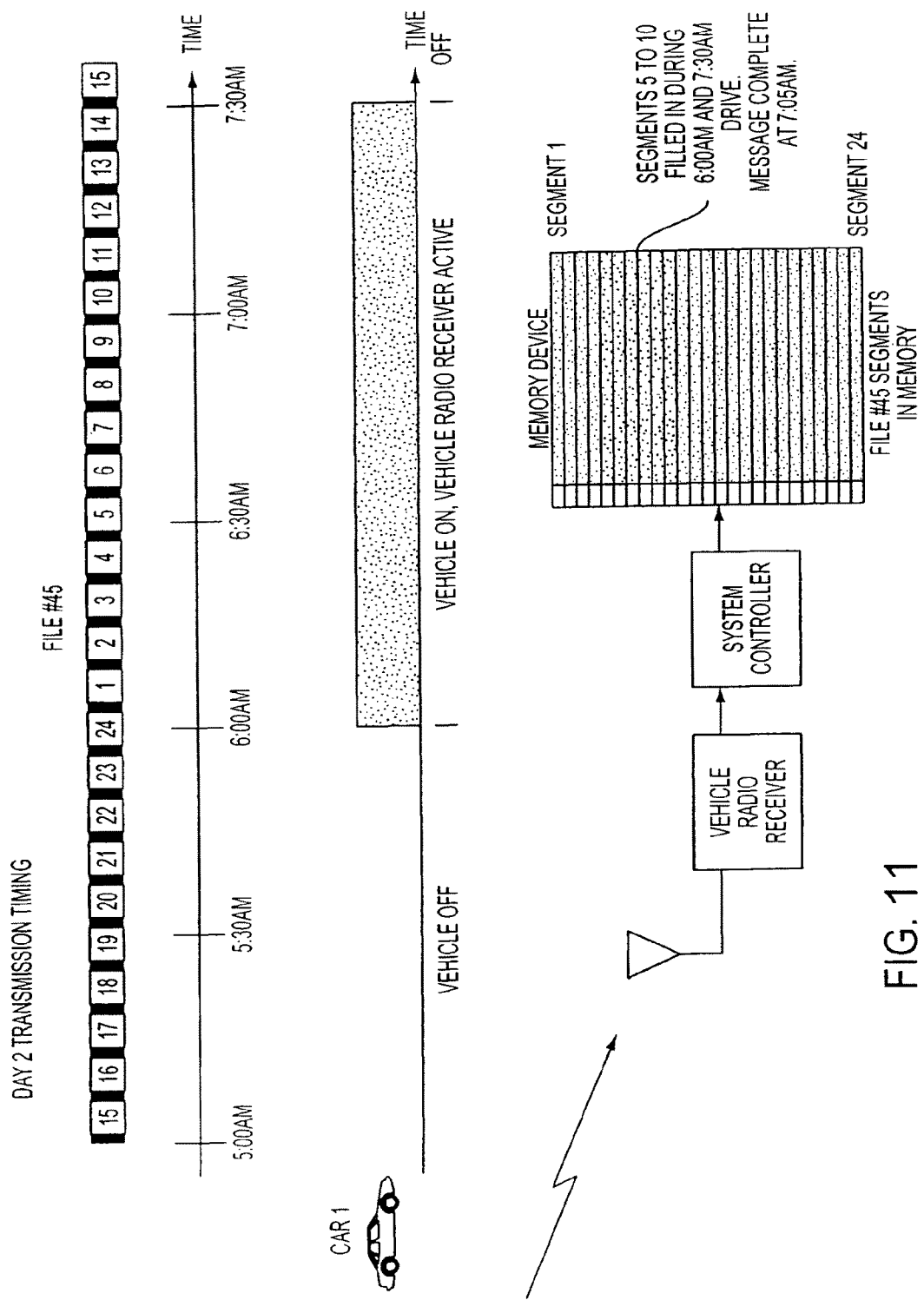

The remaining segments 5-10 of file 45 are received during the morning commute of the following day, as illustrated in FIG. 11. The system controller 60 is programmed to generate an alert message to the user to indicate that the message or file transfer is complete once the receiver has determined that all of the segments for that message or file have been successfully received and stored. The alert message, for example, can be annunciated on the display device 64 of the receiver 14 (e.g., an alphanumeric message such as "Message Complete") to prompt the user to implement a playback feature of the present invention whereby stored content from the local storage device 50 is played back whenever the user elects to do so. The alert message can even be more specific to distinguish between more than one file transfer. It is to be understood that the system 10 can employ diversity methods for broadcasting the composite data stream, in which case the receiver 14 is configured to selectively combine received, diversity, baseband streams prior to extracting the desired segments therefrom.

In accordance with present invention, the receiver 14 can be programmed with a wake-up feature when the buffer in the local storage device 50 that is allocated to the message (e.g., file 45) is substantially full (e.g., 95% full). Since the receiver can be provided with data relating to the re-broadcast times for messages and files, the receiver can use the wake-up feature to automatically tune to a particular broadcast channel during the scheduled time(s) for a selected message or file to receive the missing segments.

It is to be understood that the regular audio programming is not interrupted via file transfer process. Since composite data stream is multiplexed, a receiver 14 can be programmed to receive, demukiplex and playback a selected audio program (e.g., a jazz music program) in real-time, while the receiver demultiplexes and stores segments from messages having broadcast IDs corresponding to that receiver for playback at a later time.

Although the present invention has been described with reference to a preferred embodiment thereof, it will be understood that the invention is not limited to the details thereof. Various modifications and substitutions will occur to those of ordinary skill in the art. All such substitutions are intended to be embraced within the scope of the invention as defined in the appended claims.

What is claimed is:

1. A receiver in a digital broadcast system comprising:
   a memory device for storing content from a transmitted broadcast signal using said digital broadcast system, the content comprising data files, said data files each being partitioned into segments that are interspersed in said transmitted broadcast signal, said transmitted broadcast signal being provided with at least one header comprising information indicating the number of said segments that constitute at least one of said data files and information to identify each of said segments;
   a reception device for receiving said transmitted broadcast signal and processing said broadcast signal to obtain at least part of said content including said segments corresponding to at least one of said data files therein; and
   a processing device connected to said memory device and said reception device and being programmable to use said at least one header in said transmitted broadcast signal to determine the size of at least one section in said memory device to allocate for storing the data file, to store said segments corresponding to the data file in said allocated section, and to monitor the progress of the storage of said segments in said allocated section, said at least one header comprising data to indicate how much of said memory device needs to be allocated to store the data file;
   wherein said at least one header provides a unique identification code for each of said segments belonging to the data file and indicates in what order said segments are to appear in the data file for playback, said processing device being programmable to determine which of said segments in the data file have not been received and stored in said memory device; and
   wherein the data file is rebroadcast at least once, said processing device being operable to determine which of said segments corresponding to the data file have been stored and to store said segments that are rebroadcast if said segments are not yet stored in said memory device, and to discard said segments that are rebroadcast if said segments were previously stored in said memory device.

2. A receiver as claimed in claim 1, further comprising at least one output device connected to said processing device, said processing device being programmable to determine which of said segments corresponding to the data file has been stored in said memory device using said information to identify each of said segments and to generate an alert message on said at least one output device when each of said segments corresponding to the data file has been stored in said memory device.

3. A receiver as claimed in claim 1, wherein said at least one header comprises segment headers for respective ones of said segments, said segment headers each comprising a first field indicating the total number of segments in the data file, and a second field indicating its corresponding said identification code.

4. A receiver as claimed in claim 3, wherein said processing device is operable to determine how much of said memory needs to be allocated to store the data file using said first field in the first one if said segments that is received.

5. A receiver as claimed in claim 3, wherein said segment headers comprise an auxiliary data field comprising an expiration data for the data file corresponding thereto.

6. A receiver as claimed in claim 3, wherein said digital broadcast system can be used to broadcast a plurality of messages that are each assigned a message identification code to indicate which of a plurality of receivers in said digital broadcast system are to receive the corresponding message, each of said plurality of messages comprising one of said data files, said segment headers further comprising a message identification code, said processing device being programmable to store at least one said message identification code and to discard said segments corresponding to said plurality of messages having a different said message identification code.

7. A receiver as claimed in claim 6, wherein said message identification code can correspond to said receivers in vehicles of a particular manufacturer and at least one of a vehicle model and year of manufacture.

8. A receiver as claimed in claim 1, wherein said processing device is provided with rebroadcast information and is operable to automatically operate said receiver at a selected time of day to receive and store said segments that are not yet stored in said memory device using said rebroadcast information.

9. A receiver as claimed in claim 1, wherein said memory device comprises a first portion for storing respective ones of said data files for which all of the corresponding said segments have been received, and a second portion for storing at least part of other said data files while said segments corresponding thereto are being received.

10. A method of implementing a file transfer from a broadcast station to a receiver in a digital broadcast system comprising the steps of:
    receiving a transmitted broadcast signal having content, said transmitted broadcast signal comprising content comprising data files, said data files each being partitioned into segments that are interspersed in said broadcast signal, said transmitted broadcast signal being transmitted with at least one header comprising information indicating the number of said segments that constitute at least one of said data files and identifying each of said segments;
    selecting one of said data files to store in a memory device;
    allocating a portion of said memory device that corresponds in size to the number of said segments that constitute said selected data file as indicated by said information in said at least one header;
    analyzing said information in said at least one header to identify said segments received via said transmitted broadcast signal and corresponding to said selected data file; and
    storing said segments in said portion of said memory device that correspond to said selected data file;
    wherein said selected data file is rebroadcast at least once, and further comprising the steps of
    analyzing said information relating to the rebroadcast said segments;
    storing the rebroadcast said segments that are determined to have not been previously stored in said portion of said memory device; and
    discarding the rebroadcast said segments that are in said portion of said memory device.

11. A method as claimed in claim 10:
    assigning each of said data files a message identification code to indicate which of a plurality of receivers in said digital broadcast system are to receive the corresponding data file;
    assigning said segments in respective said data files with unique identification codes that indicate the order of said segments in a corresponding one of said data files; and
    providing said broadcast signal prior to transmission to said receivers with segment headers for respective said segments that each comprise a corresponding said message identification code, a first field indicating the total number of said segments in the corresponding one of said data files, and a second field indicating said identification code of the segment.

12. A method as claimed in claim 11, further comprising the step of rebroadcasting said segments and corresponding said segment headers at least once.

13. A method as claimed in claim 11, wherein said segment headers comprise an expiration date for the corresponding one of said data files.

14. A method as claimed in claim 11, wherein said segment headers can correspond to said receivers in vehicles of a particular manufacturer and at least one of a vehicle model and year of manufacture.

15. A method as claimed in claim 10, further comprising the step of monitoring which of said segments corresponding to said selected data file have not yet been received and stored in said portion of said memory device.

16. A method as claimed in claim 10, wherein said receiver is provided with rebroadcast schedules for said data files and further comprising the steps of:
    determining that said portion of said memory device is a selected percentage full;
    determining via said rebroadcast schedules when the selected said data file is to be rebroadcast;
    operating said receiver to automatically tune to said transmitted broadcast signal when the selected said data file is scheduled for rebroadcast;
    extracting said segments corresponding to said selected data file have not yet been received and stored in said portion of said memory device; and
    storing the extracted said segments in said portion of said memory device.

17. A method as claimed in claim 10, wherein said data files are assigned message identification codes to indicate which of a plurality of receivers in said digital broadcast system are to receive the corresponding data file, said at least one header further comprising a message identification code, and further comprising the steps of:
    storing at least one said message identification code in said memory device;
    locating and storing said segments received via said broadcast signal that constitute the data file identified via the stored said message identification code; and
    discarding said segments received via said broadcast signal that constitute said data files that are not identified via the stored said message identification code.

* * * * *